Jan. 6, 1948.　　　　A. B. NEWTON　　　　2,434,221
CONTROL MEANS FOR PLURAL STAGE REFRIGERATING SYSTEMS
Filed July 2, 1943　　　　2 Sheets-Sheet 2

Inventor
ALWIN B. NEWTON
George H Fisher
Attorney

Patented Jan. 6, 1948

2,434,221

UNITED STATES PATENT OFFICE 2,434,221

CONTROL MEANS FOR PLURAL STAGE REFRIGERATING SYSTEMS

Alwin B. Newton, Minneapolis, Minn., assignor to Minneapolis-Honeywell Regulator Company, Minneapolis, Minn., a corporation of Delaware Application July 2, 1943, Serial No. 493,180

16 Claims. (Cl. 62—4)

The present invention relates to the control of plural stage refrigeration systems. Conventional refrigeration systems are generally designed to operate under rather specific conditions, especially as to the range of cooling; hence, some systems are usable only for room and fixture cooling and the like, other systems are efficient down to about 0° F. while still other systems are required to be effective at temperatures considerably under 0° F.

The growing use of refrigeration in research, as testing equipment, and for such interesting production uses as seasoning metal objects, has increased the demand for a practical refrigeration system that will provide controlled cooling at any temperature within a range extending from near normal room temperatures to well below —100° F.

It is, therefore, an object of this invention to provide an improved refrigeration system capable of operating in a controlled manner at any temperature within a wide range of temperature.

It is another object of the present invention to provide a refrigeration system that may be started under conditions of relatively high evaporator temperatures such as may be obtained during stand-by conditions in a test chamber.

It is a further object to provide a refrigerating system that may be controlled by automatic means thereby assuring consistent results and minimizing manual attendance.

Further, it is an object of this invention to provide such control means that a minimum of special equipment is required to achieve the results desired.

It is another object to so control a plural stage refrigeration system that no more condensing units will be used than are required at any particular operating point and that, upon change of the operating point, additional units will be automatically cut in or out of the system as required.

It is an object to increase the ability of standard refrigerating equipment to reach low temperatures by refrigerating condensed refrigerant.

It is a further object to provide a refrigeration system that will operate efficiently and without mechanical trouble at any control temperature within a wide range.

It is an object to minimize, in a plural stage refrigeration system, the cost of the equipment and its power demand by operating the various units only under favorable conditions.

It is another object of this invention to use refrigerant to cool the gases discharged from one compressor into the suction of another compressor.

These and other objects will become apparent upon a study of the following specification and related drawings wherein.

Figure 1:
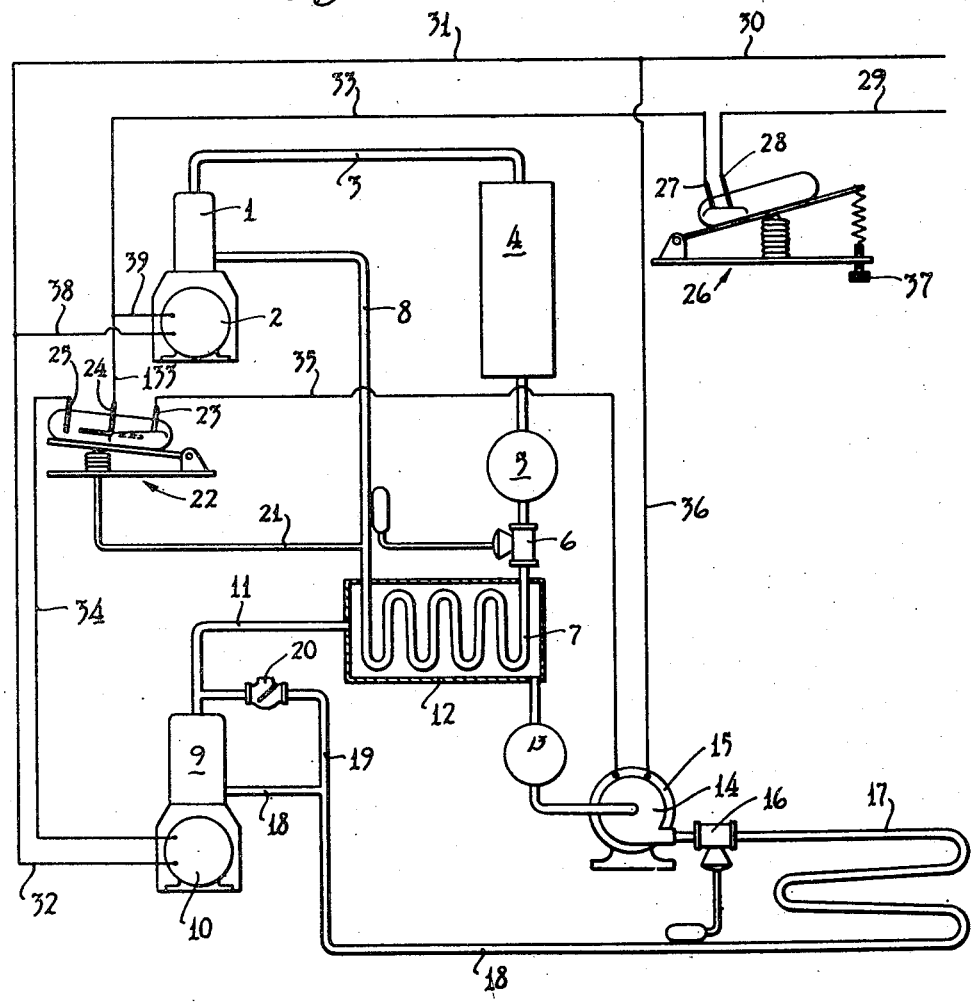
Figure 1 shows a schematic arrangement of a plural stage cascade refrigeration system and having means for controlling said system.

Returning to Figure 1, it is noted that compressor 1 is provided with motor 2 and a discharge pipe 3 running to condenser 4, condenser 4 being cooled in any convenient manner. From condenser 4, refrigerant goes to receiver 5 and thence to expansion valve 6 which supplies evaporator coil 7, and a stage of the refrigerating system is completed by suction pipe 8 leading back to compressor 1. A second stage of the refrigeration system comprises compressor 9 driven by motor 10 and having a discharge pipe 11 leading to condenser 12, which drains its condensed refrigerant into receiver 13, said condenser 12 being cooled by evaporator coil 7. From receiver 13 the refrigerant is conducted to pump 14 which is driven by motor 15, said pump delivering to expansion valve 16 and evaporator 17. From evaporator 17 the gaseous refrigerant is led back to compressor 9 by pipe 18 and to which is connected bypass 19 and check valve 20, the bypass extending between the suction and the discharge means of compressor 9.

A pressure switch 22 is connected to suction pipe 8 of compressor 1 by tube 21, the pressure switch having terminals 23, 24, and 25. A thermostat 26, which responds to the effects of evaporator 17, is also provided, having terminals 27 and 28 and adjusting means 37. It will be noted that the refrigerant systems of these two stages are separate, thus making it possible to use different refrigerants. Normally, a conventional refrigerant such as F12 is used in the system having compressor 1 and a lower boiling point refrigerant such as F22, or the like, may be used in the system of compressor 9. Pump 14 is shown as a centrifugal pump, but it is obvious that any suitable pump may be used, the principal requirement being the ability to pump liquid refrigerant at relatively high pressure and to permit passage of refrigerant with a minimum pressure loss when the pump is not operating. Obviously, a by-pass, not shown, having a check valve, may be provided around any selected pump.

Operation of Figure 1

The operation of the invention described is as follows: In Figure 1, upon a demand for refrigeration as determined by a rise in temperature at thermostat 26, and which results in contact being made between terminals 27 and 28, motor 2 is energized by a circuit as follows: wire 29, thermostat terminals 28 and 27, wire 33, wire 39, motor 2, wire 38, wire 31, and wire 30. This places compressor 1 in operation to start the refrigeration cycle.

Gaseous refrigerant is compressed in compressor 1 and discharged through pipe 3 into the condenser 4 where heat is removed in any convenient manner. Refrigerant is discharged to receiver 5 from whence it flows through expansion valve 6 to evaporator coil 7 and back to compressor 1 through pipe 8 in a manner well known. Assuming that compressor 1 has been started from standby conditions, the pressures of the refrigerant in its system are those due to the temperatures of such stand-by conditions. It will be noted that in times of comparatively high pressure existing in suction pipe 8 of compressor 1, pressure switch 22 is in such position that a circuit is made to motor 15 as follows: wire 29, thermostat terminals 28 and 27, wire 33, wire 133, terminals 24 and 23 of pressure switch 22, wire 35, motor 15 and wire 36 to wire 30. Hence, it will be seen that motor 15 and pump 14 operate in conjunction with the operation of compressor 1 and motor 2 so long as high pressure conditions exist in suction line 8. Pump 14 serves to circulate the refrigerant existing in a second portion of the system and provides sufficient pressure head against expansion valve 16 to allow normal operation of said valve and evaporator 17 so that heat is extracted through evaporator 17 in a conventional manner. Refrigerant is returned through pipe 18, by-pass 19, check valve 20, pipe 11, condenser 12, receiver 13, and back to pump 14 to complete the cycle. By-pass 19 and check valve 20 may be eliminated if the valves in compressor 9 are so arranged as to act in a like manner, that is, if the valves have sufficiently low spring pressures and are both located in the head of the compressor.

With compressor 1 and pump 14 operating, the refrigeration provided in the higher temperature range of the system is as readily controlled as in a single stage system, the refrigerant in the second stage merely acting as a heat exchange fluid. Control is exercised by thermostat 26. The ability to operate a cascade refrigeration system in this manner is of special value in those installations such as test chambers and the like, where controlled cooling at any specified temperature within a wide range is required. The conventional cascade refrigeration system is well known as one of the most efficient commercially available for low temperature operation, while the system as at present described discloses the efficient use of such a system over a wide range of tempertaures including higher temperatures than are normally associated with a plural stage refrigeration system.

The pressure and temperature of the second stage refrigerant in condenser 12 is determined by the temperature of evaporator 7. When compressor 9 is not operating, the temperature in evaporator 17 will, therefore, be close to that in 7. The refrigerating effect at evaporator 17 is principally due to the action of compressor 1 operating alone, pump 14 serving to circulate the lower boiling point refrigerant as a heat exchange fluid and to provide sufficient pressure difference to insure operation of expansion valve 16, as before mentioned.

When the selected operating temperature is sufficiently low, compressor 1 will be operated, by thermostat 26, to lower the pressure in 7 and, correspondingly, in 17. When the pressure in evaporator 7 and its connected suction pipe 8 reaches a predetermined low level, pressure switch 22 is actuated to open the circuit between terminals 23 and 24, thus stopping motor 15 and pump 14. Also, a circuit is completed which starts motor 10 of compressor 9 as follows: wire 29, terminal 28, terminal 27, wire 33, wire 133, terminal 24, terminal 25, wire 34, motor 10, wire 32, wire 31 and wire 30.

With compressor 9 operating, the pressure is further lowered in evaporator 17 and increased in heat exchanger 12, thereby providing additional cooling at 17 and adding more load to compressor 1, thereby increasing the total refrigerating effect of the system. The differential of pressure switch 22 is so chosen that this initial pressure rise in 7 and 8 does not stop compressor 9. The continued operation of compressors 1 and 9 will tend to lower the pressure in their respective evaporators, the lowered pressure of evaporator 17 permitting low temperature refrigeration. Thermostat 26 is still in control of the system. With compressor 9 operating, check valve 20 is closed because of the pressure in 11 being higher than that in 18. The refrigerant flows readily through centrifugal pump 14 due to its open construction, or may flow through a by-pass if such be provided.

It will be noted that by not starting compressor 9 until pressure conditions in line 11 and condenser 12 have been reduced sufficiently low, no overload is likely to be thrown on motor 10, thereby compressor 9 and motor 10 may be of comparatively light construction and motor 10 may be proportioned for running condition without much regard to overload starting condition. Obviously, pressure switch 22 may be connected with discharge pipe 11 if desired, instead of suction pipe 8, as shown.

Figure 2

Figure 2:
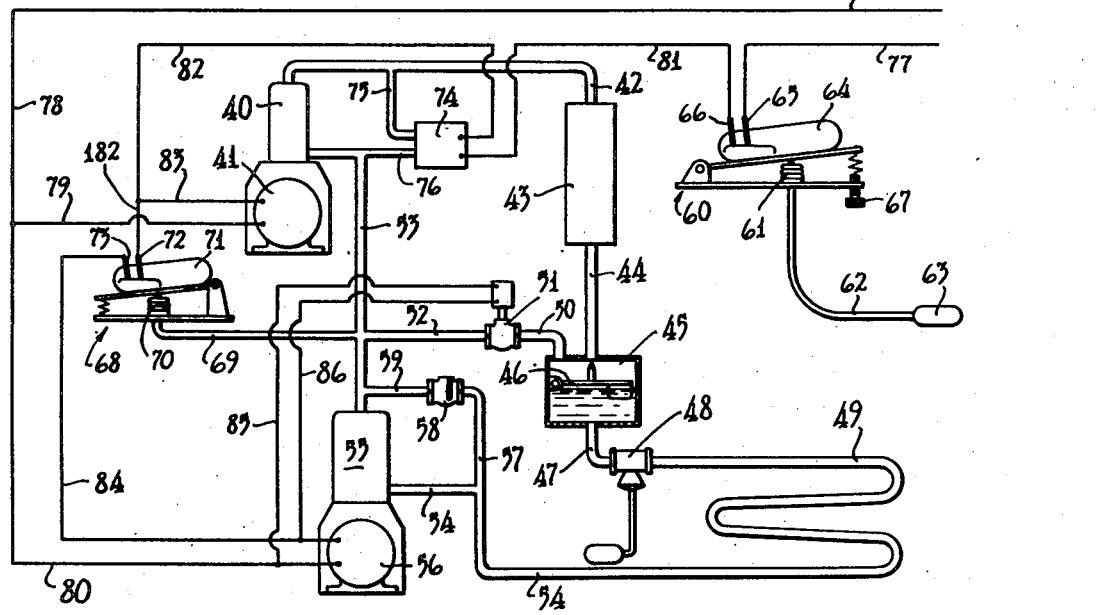
Figure 2 is a schematic showing of a plural stage refrigerator system incorporating a flash chamber.

Figure 2 also shows a plural stage refrigeration system comprising high pressure compressor 40 driven by motor 41 discharging compressed refrigerant through pipe 42 to condenser 43. Condenser 43 is connected by pipe 44 to flash chamber 45, flash chamber 45 comprising a receptacle having a gas receiving portion and a liquid receiving portion and having its inlet controlled by a float valve 46. An outlet 47 from said chamber leads from below the liquid level to expansion valve 48 and evaporator 49. Another outlet 50 leads from the gas receiving portion of said receptacle 45 to normally closed valve 51, pipe 52, and suction pipe 53 of compressor 40. From evaporator 49 extends suction pipe 54 leading to compressor 55 having a motor 56, said compressor 55 discharging into suction pipe 53. A by-pass is provided extending from suction pipe 54 to suction pipe 53, said by-pass comprising pipe 57, check valve 58, and pipe 59.

To control this system a thermostatic device 60, comprising expansible bellows 61, a tube 62, bulb 63, and a mercury switch 64 having terminals 65 and 66, and adjusting means 67 is provided. The control means for the system further includes pressure switch 68 connected to suction means 53 by tube 69 and comprising expansible bellows 70 and mercury switch 71 having terminals 72 and 73, this switch being so arranged that upon low pressure in line 53 the circuit is completed between points 72 and 73, whereas on high pressure the contact is broken. A control means 74 may also be provided, this means being connected to pipe 42 by tube 75 and to pipe 53 by tube 76 and may comprise any conventional limit control arrangement such as a high pressure limit switch connected to the high pressure pipe 42 of the refrigeration system and a low pressure limit switch connected to the suction pipe 53. These switches may be connected in series so that when either a high pressure exceeds the desired value or the suction pressure drops below its desired value, the current will be shut off. This control may also be of the type described in application Serial No. 371,001, filed December 20, 1940, Patent No. 2,377,503, issued June 5, 1945. As this control may or may not be used, its details are no part of the present invention and it has not been specifically disclosed.

It will be noted that upon a rise in temperature and a consequent rise in pressure in thermostat 60 contact is made between points 65 and 66 and, providing controller 74 permits, will effect immediate operation of motor 41. Compressor 40, driven by motor 41, operates alone until pressures in suction pipe 53 are sufficiently reduced to permit operation of compressor 55 and to open valve 51. With the controls in the positions shown both compressors are operating, valve 51 is open and check valve 58 is closed.

*Operation of Figure 2*

In Figure 2, plural stage operation is also obtained, but in this modification, a single refrigerant is used. Assuming that there is a demand for refrigeration, and both compressors are operating, the operation will be as follows: Compressor motor 41 is energized as follows: wire 77, mercury switch 64, wire 81, controller 74, wire 82, wire 83, motor 41, wire 79 and wire 78. Compressor motor 56 is energized as follows: wire 77, mercury switch 64, wire 81, controller 74, wire 82, wire 182, mercury switch 71, wire 84, motor 56, wire 80 and wire 78. Valve 51 is also energized, being connected in parallel with motor 56 by wires 85 and 86. With the system thus in full operation, refrigerant is compressed in compressor 40, delivered through pipe 42 to condenser 43, from which heat is extracted in the normal manner, and from condenser 43 the refrigerant runs through pipe 44 to flash chamber 45, wherein liquid accumulates in the bottom portion of said chamber 45 until it reaches a level wherein float valve 46 is operated to close the inlet and prevent further liquid from coming in.

The upper, or gas receiving portion of flash chamber 45 connects through pipes 50 and 52 to suction pipe 53 of compressor 40, which suction pipe 53 is also a discharge pipe for compressor 55. Valve means 51 is located between pipes 50 and 52, the valve means being opened in the case of full operation. Hence, it will be seen that the gas receiving portion of flash chamber 45 tends to have a pressure similar to that of the discharge pressure of compressor 55 or suction pressure of 40.

Liquid flows from the liquid receiving portion of flash chamber 45 through pipe 47 to expansion valve 48 and from there to evaporator 49 in a conventional manner and from evaporator 49 the refrigerant flows through suction pipe 54 into compressor 55, the by-pass not being in operation and check valve 58 being closed.

It will be noted that a certain amount of expansion takes place in flash chamber 45 and the temperature of the refrigerant is thereby reduced from that prevailing in condenser 43. Due to the reduction in pressure and the consequent expansion permitted in the refrigerant coming from condenser 43, refrigerant near the boiling point is vaporized and entrained gases expand, thereby extracting heat from the remaining liquid in flash chamber 45 and cooling same. The relatively cool gases passing from flash chamber 45 through pipes 50 and 52 into the suction pipe 53 intermingle with the hot compressed gases of compressor 55 and cool said gases before they enter compressor 40, thus permitting operation of compressor 40 with comparatively low gas temperatures.

Upon satisfying the demand for refrigeration, the circuit will be broken by thermostat device 60 and all apparatus will be stopped. Upon a subsequent demand for refrigeration, motor 41 will be energized immediately and motor 56 will be started only if pressure conditions in suction line 53 are such as to permit its proper operation. In the event that suction pressures in line 53 are too high to permit proper operation of compressor 55, pressure switch 68 will have its bellows 70 expanded and the connection between 72 and 73 will be broken. Hence, motor 56 will not start and valve 51 will be in its normal closed position. Refrigerant will then pass from compressor 40 through pipe 42 to condenser 43, pipe 44, flash chamber 45, pipe 47, expansion valve 48, evaporator 49, pipe 54, pipe 57, check valve 58, pipe 59, and suction pipe 53 back to the compressor 40, thus completing a normal refrigeration cycle, and flash chamber 45 will serve no purpose other than as a receiver unless a throttling valve, a restriction, or the like, be provided in place of, or in conjunction with, valve 51.

Figure 3:
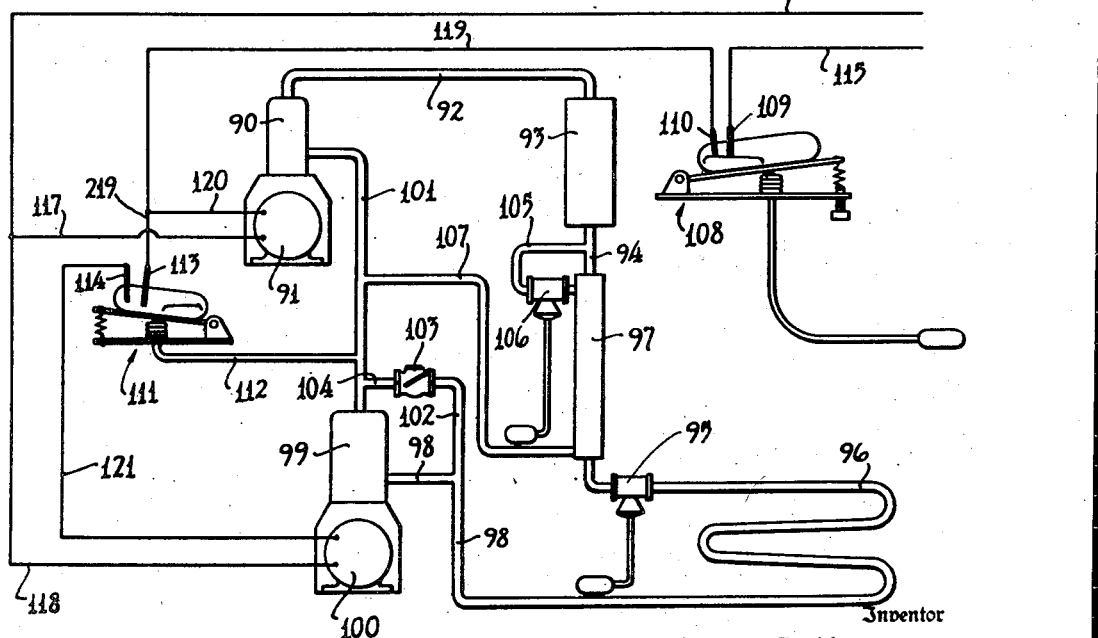
Figure 3 is a view similar to that of Figure 2, but wherein an expansion valve and a heat exchanger are used instead of a flash chamber.

*Figure 3*

Figure 3 shows an arrangement similar to that of Figure 2 comprising high pressure compressor 90 driven by motor 91, said compressor 90 discharging through pipe 92 to condenser 93 from which extends a refrigerant discharge pipe 94 leading to expansion valve 95 and evaporator 96. Conduit 94 extends through a heat exchange device 97 which will be further described. From evaporator 96 extends suction pipe 98 to compressor 99 driven by motor 100, and from compressor 99 extends discharge pipe 101 which connects with the suction of compressor 90. A by-pass is provided between pipes 98 and 101 comprising pipe 102, check valve 103, and pipe 104. A branch connection 105 is taken from refrigerant pipe 94 and leads to expansion valve 106 and thence into heat exchanger 97. A discharge pipe 107 is taken from heat exchanger 97 and leads to the suction pipe 101 of compressor 99.

A normally closed valve, such as valve 51 in the preceding figure, may be used in line 107 if desired and connected as shown in Figure 2. The controls of the present system are similar to those of Figure 2 and comprise a thermostat 108 similar to 60, above, and having terminals 109 and 110, and a pressure switch 111 similar to that of the figure above, connected by tube 112 to pipe 101, and which includes terminals 113 and 114.

Operation of Figure 3

The operation of the structure shown in Figure 3 is quite similar to that of Figure 2. The controls are shown in a position wherein refrigeration is demanded and the suction pressure of the high pressure refrigerator is too high to prevent starting of the low pressure compressor. Because of the demand for refrigeration, device 108 is in a position where contact is made between terminals 109 and 110 and compressor motor 91 is energized as follows: wire 115, terminals 109 and 110 of thermostat 108, wire 119, wire 120, compressor motor 91, wire 117 and wire 116. Pressure switch 111 is in such position that no contact is made between terminals 113 and 114, and under such conditions compressor motor 100 is deenergized. With only compressor 90 operating, refrigerant is compressed in the same, delivered through discharge pipe 92 into condenser 93, from whence heat is extracted as conventional. The refrigerant is discharged from condenser 93 through pipe 94 which extends through a heat exchanger 97 to expansion valve 95 and evaporator 96. A portion of the refrigerant is diverted from pipe 94 through pipe 105, expansion valve 106, and thence into the heat exchanger 97, which acts as an evaporator and serves to cool the refrigerant passing through conduit 94. The diverted refrigerant, which expands in heat exchanger 97, is returned to the system through pipe 107, to suction line 101 of compressor 90, the setting of valve 106 being such that only a portion of the refrigerant may be diverted through pipe 105.

The refrigerant which pursues the normal path through pipe 94, expansion valve 95, and evaporator 96, is returned to the system through pipe 98, by-pass pipe 102, check valve 103, pipe 104, pipe 101 and thence to compressor 90. This circuit is maintained until pressures existing in pipe 101 are sufficiently lowered to actuate pressure switch 111 and make contact between terminals 113 and 114, at which point motor 100 is energized as follows: wire 115, terminals 109 and 110 of thermostat 108, wire 119, wire 219, terminals 113 and 114 of pressure control 111, wire 121, motor 100, wire 118 and wire 116. Upon energizing of motor 100, compressor 99 is put in operation and discharges into suction pipe 101 where the gas is further compressed in compressor 90 and the circuit is followed as before with the exception that by-pass pipe 102, check valve 103, and pipe 104 are not used, check valve 103 being closed, the refrigerant passing through compressor 99.

It will be noted that not only is refrigerant passing through pipe 94 further cooled by action of the heat exchanger 97, but the gases flowing from compressor 99 to compressor 90 are cooled by the intermingling of the diverted portion of refrigerant through line 107, thus protecting compressor 90 from gases having unduly high temperatures.

Upon satisfying the demand for refrigeration, all circuits are broken in thermostatic device 108, and all the apparatus is made inoperative.

In the present specification and drawings it is considered that the examples given are illustrative only and not intended to limit the invention, the scope of the invention being determined by the following claims.

I claim as my invention:

1. In a plural compressor refrigeration system having a condenser and an evaporator wherein the discharge of one compressor enters the condenser and the inlet of another compressor is supplied gaseous refrigerant from the evaporator, control means having means responsive to cooling demand for governing the operation of the one compressor, and means responsive to the operation of the one compressor for governing the operation of said other compressor.

2. In a refrigeration system, a plurality of compressor units adapted to operate at progressively lower pressures, the highest pressure unit discharging into a condenser, the lowest pressure unit receiving gaseous refrigerant from an evaporator, the operation of a higher pressure unit reducing the operating pressure of the next lower pressure unit, and control means responsive to the suction pressure of a higher pressure compressor unit for governing the operation of said next lower pressure compressor unit.

3. A refrigeration system comprising a plurality of stages wherein the evaporator of one stage is in heat exchange relation to the condensing means of an adjacent stage, and wherein said adjacent stage is placed in operation in response to a predetermined suction pressure in said one stage.

4. A wide range refrigeration system comprising a plurality of stages wherein a first stage comprises a compressor, a condenser, an expansion valve, an evaporator and means responsive to the suction pressure of said compressor, a second stage comprising a compressor, a condenser associated with the evaporator of the first stage, an expansion valve and an evaporator, each of the compressors having individual drive means, and control means comprising said suction pressure responsive means for starting the second stage compressor in response to a predetermined suction pressure of the first stage.

5. A wide range plural stage refrigerator wherein each stage has a separate and sealed refrigerant circuit, said stages operating at different pressures, a low pressure stage including an individually driven pump between the condensing means and expansion valve, and control means causing the pump to operate in response to relatively high suction pressures in a higher pressure stage and stopping said pump in response to relatively low suction pressures in said higher pressure stage.

6. In a refrigeration system, a plurality of compressors connected in series, a condenser, an evaporator, the high pressure end of the series supplying compressed refrigerant to the condenser and the low pressure end of the series receiving refrigerant from the evaporator, and means including valve means permitting circulation of the refrigerant through the system when only the compressor of the high pressure end of the series is operating.

7. A low temperature refrigeration system comprising compressors connected in series, the high pressure end of the series supplying compressed refrigerant to a condenser and the low pressure end of the series receiving refrigerant from an evaporator, valve controlled cooling means interposed between the condenser and the evaporator for cooling the refrigerant before it reaches said evaporator, said cooling means being connected to the means connecting the compressors, and control means responsive to the refrigerant pressure in the means connecting the compressors for controlling one of said compressors.

8. A refrigeration system comprising a plurality of individually operable compressors connected in series, a condenser, a flash chamber, an expansion valve, an evaporator, said flash chamber being connected between the condenser and the expansion valve, said flash chamber having a float controlled valve controlling the flow of refrigerant into said chamber, the upper portion of said chamber being connected by conduit means to the means connecting the compressors, normally closed valve means in said conduit means, means responsive to the pressure in said connecting means, and control means wherein, upon a demand for refrigeration, a high pressure stage compressor is started and run, thus providing refrigeration and also cooling the refrigerant within the system and lowering its pressure on the system until a predetermined pressure is reached in said connecting means at which point an additional compressor is started and the normally closed valve is opened.

9. A refrigeration system comprising a plurality of compressors connected in series, a condenser, a discharge means extending from said condenser to an expansion valve and evaporator, a second expansion valve connected to the discharge means from the condenser and to means in heat exchange relation with said discharge means, conduit means leading from the heat exchange means to the means connecting said compressors in series, and means for starting one of said compressors in response to a condition affected by another compressor.

10. A refrigeration system comprising a first compressor and a second compressor, means connecting the outlet of the first compressor to the inlet of the second compressor, a condenser for receiving compressed refrigerant from the second compressor, refrigerant conduit means connecting the outlet of the condenser to an expansion valve and an evaporator, means in heat exchange relation with said conduit means, means connecting the outlet of the evaporator to the inlet of the first compressor, bypass means including a check valve extending between the inlet and outlet of the first compressor, and means connecting a second expansion valve to said refrigerant conduit means and to said means in heat exchange relation with said refrigerant conduit means, the outlet of said heat exchange means being connected to the means connecting the outlet of the first compressor and the inlet of the second compressor.

11. In a cascade refrigerating system having a plurality of independently driven compressors, valve controlled means permitting refrigerant flow from the inlet to the outlet means of a compressor of a low temperature stage of said system when said compressor is not operating, and pump means for circulating refrigerant through said stage when said compressor is inoperative.

12. In a cascade refrigerating system having a plurality of independently driven compressors, valve controlled means permitting refrigerant flow from the inlet to the outlet means of a compressor of a low temperature stage of said system when said compressor is not operating, pump means for circulating refrigerant through said stage when said compressor is inoperative, and means responsive to a condition indicative of the refrigerant pressure in said stage for causing operation of either said pump or said compressor depending on the value of said condition.

13. In a refrigerating system including an evaporator, means including a first compressing means having inlet means and a second compressing means, said means including said first and second compressing means coacting to supply refrigerant to said evaporator at a suitable pressure, means responsive to a demand for refrigeration controlling the operation of said first compressing means, and means responsive to a condition indicative of the pressure of the refrigerant in the inlet means of said first compressing means to control the operation of said second compressing means.

14. A wide range refrigerating system comprising, in combination, a plurality of compressors each having inlet and outlet means, one of said compressors being adapted to start from stand-by operation and being capable of operating said refrigerating system over an upper portion of the desired temperature range, another compressor being capable of cooperating with said one compressor for operating said refrigerating system over a lower portion of the desired temperature range, means connecting the outlet means of said other compressor in fluid flow relation to the inlet means of said one compressor, and means controlling the operation of said other compressor in response to the inlet pressure of said one compressor.

15. In a refrigerating system, in combination, a plurality of individually driven compressors connected in series, a condenser, an expansion valve, an evaporator, means connecting the evaporator to the inlet of the lowest pressure compressor in the series, and conduit means including a check valve connected to said connecting means in bypass relation to said lowest pressure compressor whereby the system may function without operating said lowest pressure compressor.

16. A plural compressor refrigeration system comprising a condenser and an evaporator, conduit means connecting said condenser and said evaporator, fluid passage means connecting the outlet of one compressor to the inlet of another compressor, a valve controlled bypass conduit connecting said conduit means and said fluid passage means to permit refrigerant to flow therethrough, and temperature responsive means for controlling the operation of one of said compressors.

ALWIN B. NEWTON.

REFERENCES CITED

The following references are of record in the file of this patent:

UNITED STATES PATENTS

| Number | Name | Date |
| --- | --- | --- |
| 2,272,083 | Candor | Feb. 3, 1942 |